(12) United States Patent
Jeon

(10) Patent No.: US 7,478,659 B2
(45) Date of Patent: Jan. 20, 2009

(54) STICKER WEIGHT PRESSURIZER FOR WHEELS

(75) Inventor: Seon-Gyu Jeon, Suwon-si (KR)

(73) Assignee: Kia Motors Corporation, Seoul (KR)

( * ) Notice: Subject to any disclaimer, the term of this patent is extended or adjusted under 35 U.S.C. 154(b) by 607 days.

(21) Appl. No.: 11/299,359

(22) Filed: Dec. 8, 2005

(65) Prior Publication Data

US 2007/0080576 A1    Apr. 12, 2007

(30) Foreign Application Priority Data

Oct. 11, 2005    (KR) .................... 10-2005-0095699

(51) Int. Cl.
*B32B 37/00* (2006.01)
(52) U.S. Cl. .................. 156/358; 156/579; 156/581
(58) Field of Classification Search ................ 156/358, 156/538, 556, 580, 581, 583.1; 29/802; 100/269.01, 100/269.02, 269.03
See application file for complete search history.

(56) References Cited

U.S. PATENT DOCUMENTS

| | | | |
|---|---|---|---|
| 4,554,734 A * | 11/1985 | Sander | ......................... 29/818 |
| 5,134,766 A | 8/1992 | Miller | |
| 5,557,043 A * | 9/1996 | Drechsler | ..................... 73/468 |
| 5,922,227 A | 7/1999 | McMurtrie | |
| 6,539,852 B2 * | 4/2003 | Ertl | ............................ 100/211 |
| 7,237,326 B2 * | 7/2007 | Boni et al. | ..................... 29/705 |

FOREIGN PATENT DOCUMENTS

| | | |
|---|---|---|
| DE | 100 06 176 A 1 | 2/2000 |
| DE | 19922085 | 12/2000 |
| JP | 03-224802 | 10/1991 |
| JP | 07-276527 | 10/1995 |

OTHER PUBLICATIONS

Author Disclosed Anonymously, "Adhesive Wheel Weight Attaching Tool," *Research Disclosure* (2003).

* cited by examiner

*Primary Examiner*—James Sells
(74) *Attorney, Agent, or Firm*—Morgan, Lewis & Bockius LLP

(57) ABSTRACT

A sticker weight pressurizer includes a base plate, a hanger which protrudes upwards from a center portion of the base plate, double-acting cylinders which are disposed on the base plate on opposite sides of the hanger, a pressure block on one end of a piston rod of each of the double-acting cylinders, a regulator valve which adjusts pressure of compressed air supplied from a pneumatic pressure source, and a direction control valve which transfers pressure, supplied from the regulator valve, to the double-acting cylinders while controlling the direction of the pressure.

3 Claims, 6 Drawing Sheets

STICKER WEIGHT PRESSURIZER FOR WHEELS

CROSS-REFERENCE TO RELATED APPLICATIONS

The present application is based on, and claims priority from, Korean Application Serial Number 10-2005-0095699, filed on Oct. 11, 2005, the disclosure of which is hereby incorporated by reference herein in its entirety.

FIELD OF THE INVENTION

The present invention relates to sticker weight pressurizers for wheels and, more particularly, to an apparatus which pressurizes a sticker weight, adhered to a wheel to balance the weight of the wheel, thus adhering the sticker weight to the wheel more securely.

BACKGROUND OF THE INVENTION

Generally, when the weight of a wheel, to which a tire is mounted, is unbalanced, a wheel axle undesirably vibrates.

In the conventional arts, to correct such an unbalanced wheel to which a tire has been mounted, a degree of imbalance of a wheel is measured, and a weight corresponding to the degree of imbalance is then interposed between the wheel and the tire. Recently, a sticker weight, which adheres to the circumferential inner surface of a wheel, has been used.

However, if the sticker weight is adhered to the wheel under insufficient pressure, there is a possibility of undesirable removal of the sticker weight from the wheel when a vehicle travels.

SUMMARY OF THE INVENTION

Embodiments of the present invention provide a sticker weight pressurizer for wheels, which presses a sticker weight onto a circumferential inner surface of a wheel under sufficient pressure such that the sticker weight is securely adhered to the wheel, thus ensuring reliable adhesion.

A sticker weight pressurizer for wheels according to an embodiment of the present invention includes a base plate. A hanger protrudes upwards from an intermediate portion of the base plate. Double-acting cylinders are disposed on the base plate on opposite sides of the hanger. A pressure block is provided on an end of a piston rod of each of the double-acting cylinders. A regulator valve adjusts pressure of compressed air supplied from a pneumatic pressure source. A direction control valve transfers pressure, supplied from the regulator valve, to the double-acting cylinders while controlling a direction of the pressure.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, an embodiment of the present invention will be described in detail with reference to the attached drawings.

Figure 1:
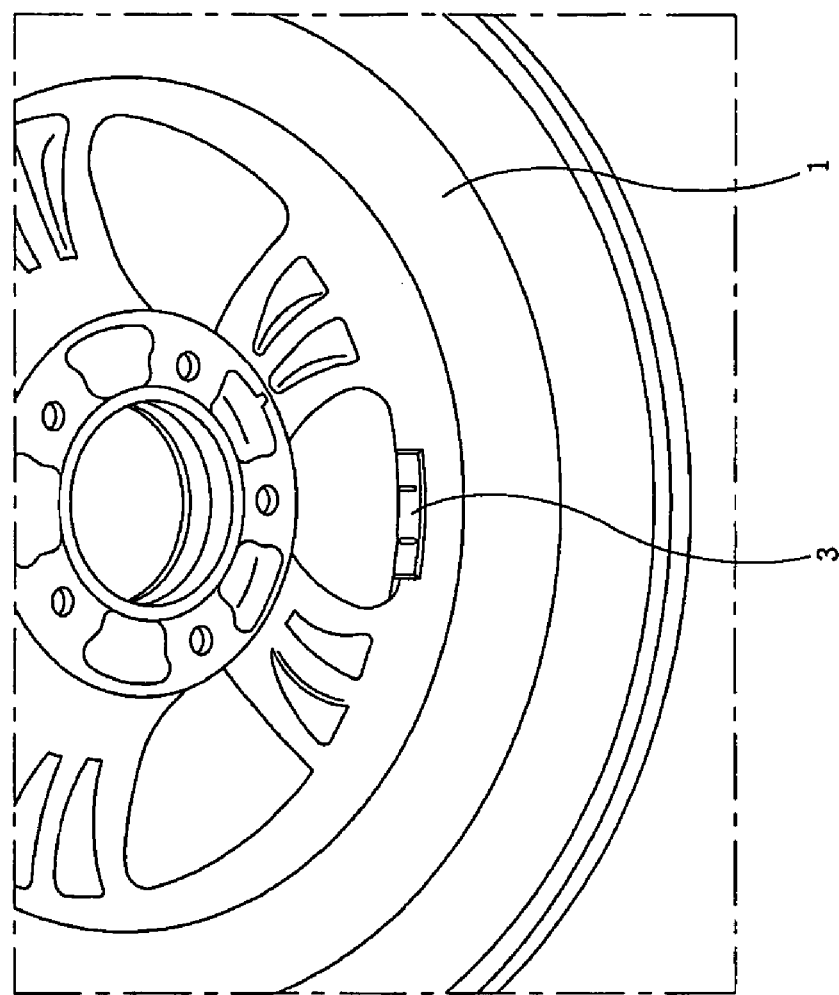
FIG. 1 is a view showing a sticker weight adhering to a circumferential inner surface of a wheel.

Referring to FIG. 1, a sticker weight pressurizer 25 presses the sticker weight 3 onto the circumferential inner surface of the wheel 1 under sufficient pressure, thus ensuring a reliable adhesion state of the sticker weight 3.

Figure 2:
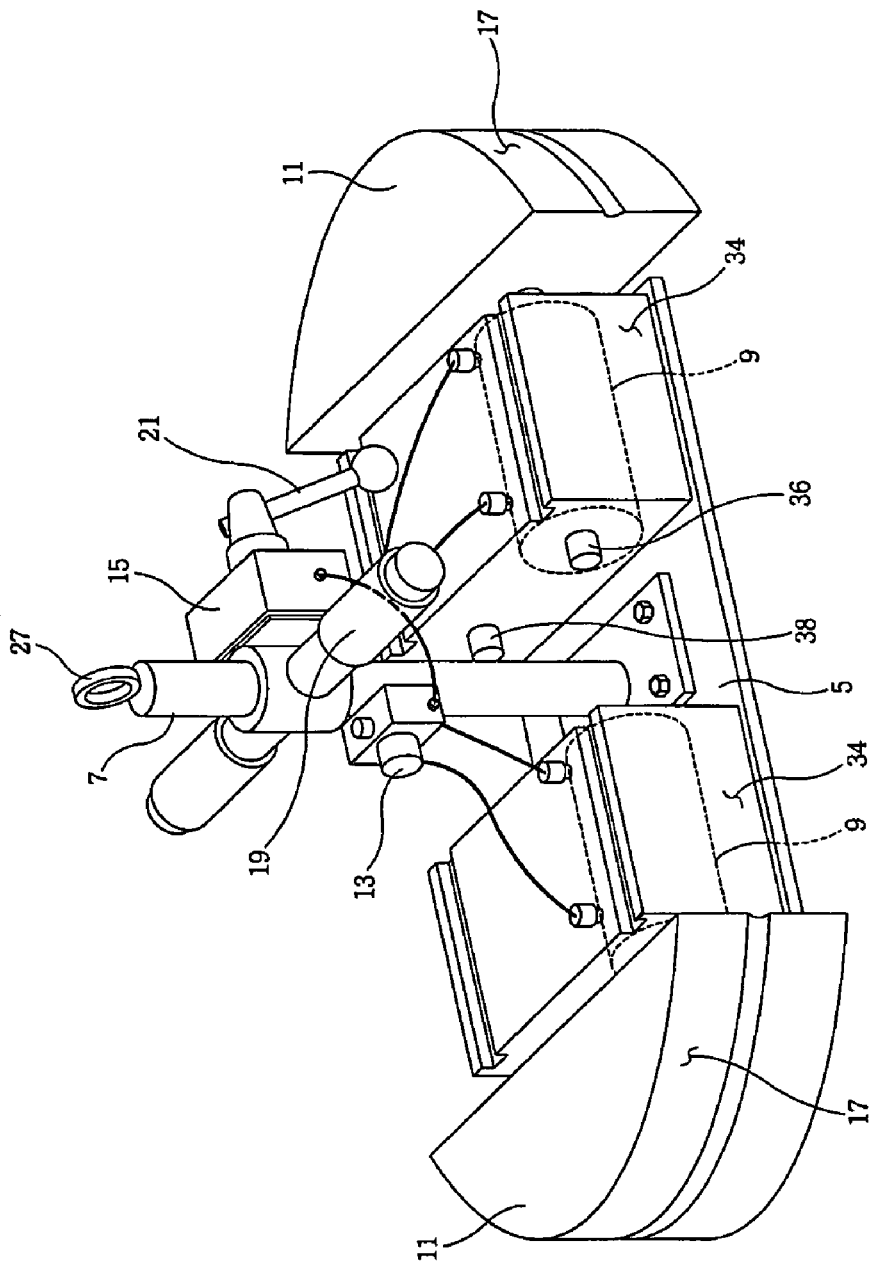
FIG. 2 is a perspective view of the sticker weight pressurizer, according to an embodiment of the present invention.
Figure 3:
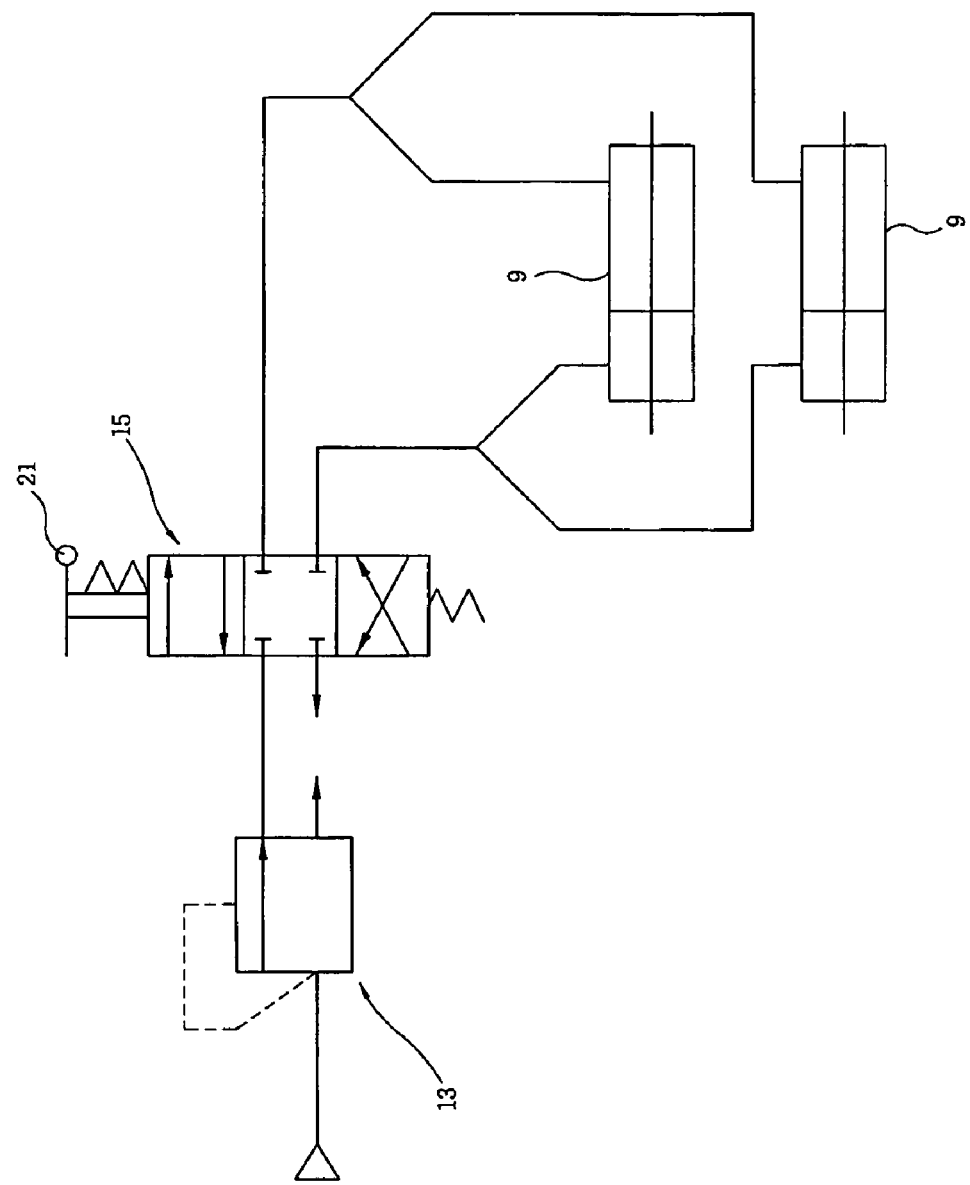
FIG. 3 is a pneumatic circuit diagram of the sticker weight pressurizer of FIG. 2.

Referring to FIGS. 2 and 3, the sticker weight pressurizer 25 according to the preferred embodiment of the present invention includes a base plate 5, a hanger 7 which protrudes upwards from a center portion of the base plate 5, and double-acting cylinders 9 which are symmetrically disposed on the base plate 5 on opposite sides of the hanger 7. The sticker weight pressurizer 25 further includes a pressure block 11 which is provided on an end of a piston rod of each double-acting cylinder 9, a regulator valve 13 which adjusts the pressure of compressed air supplied from a pneumatic pressure source (not shown), and a direction control valve 15 which transfers pressure, supplied from the regulator valve 13, to the double-acting cylinders 9 while controlling the direction of the pressure.

Each pressure block 11 has an outer surface 17 that presses the circumferential inner surface of the wheel 1, which describes a circular arc having a curvature radius less than the curvature radius of the inner surface of the wheel 1 (see FIG. 2).

Both the regulator valve 13 and the direction control valve 15 are mounted to the hanger 7, and a grip 19 protrudes from the hanger 7 in a lateral direction.

The direction control valve 15 is manual, that is, it is operated by a user when rotating a lever 21. The direction control valve 15 is a type that can operate the double-acting cylinders 9 in both directions from neutral states. The direction control valve 15 is constructed such that pneumatic pressure is branched and supplied from the direction control valve 15 to the two double-acting cylinders 9.

Referring to FIG. 3, the two double-acting cylinders 9 are coupled in parallel to the direction control valve 15. Thus, when the direction control valve 15 is operated, the two double-acting cylinders 9 are operated in opposite directions, so that the pressure blocks 11 are operated inside the wheel 1 in directions moving away from each other or approaching each other.

As shown in FIG. 2, each double-acting cylinder 9 is installed in each hexahedral body 34, which is mounted on the base plate 5. A portion of the piston rod 36 of the double-acting cylinder 9 extends outside of the hexahedral body 34. A guide bar 38 is mounted to each hexahedral body 34 in a direction-parallel to the piston rod 36 so as to stably support motion of the pressure block 11.

The operation of the sticker weight pressurizer 25 having the above-mentioned construction will be described herein below with reference to FIGS. 4 through 6.

Figure 4:
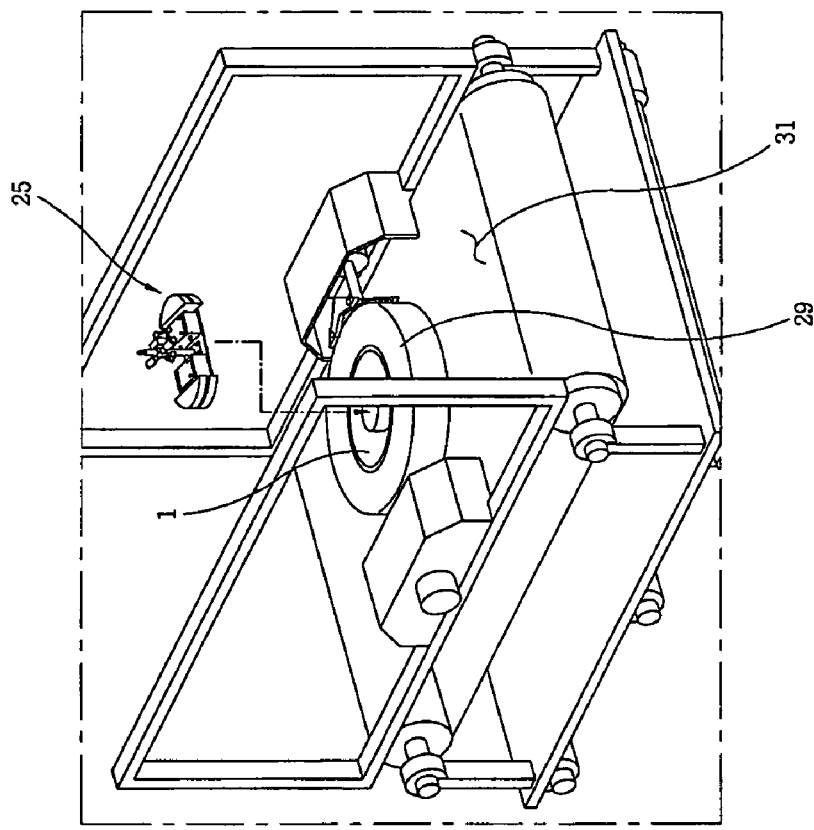
FIGS. 4 through 6 are views illustrating the usage of the sticker weight pressurizer of FIG. 2.

Referring to FIG. 4, the wheel 1, to which the tire 29 is mounted, is placed on a conveyor belt 31, and the sticker weight pressurizer 25 is positioned above the wheel 1. The sticker weight pressurizer 25 is supported and guided by an apparatus (not shown) that allows the sticker weight pressurizer 25 to move freely in horizontal and vertical directions. The apparatus can be selected by a person of ordinary skill in the art; therefore further explanation is deemed unnecessary.

In one embodiment, a ring 27 is provided on an upper end of the hanger 7, so that the sticker weight pressurizer 25 is coupled to the supporting and guiding apparatus through the ring 27.

The user measures an amount of imbalance of the wheel 1 to which the tire 29 is mounted. Thereafter, a sticker weight 3 having a corresponding weight is preliminarily adhered to the circumferential inner surface of the wheel 1.

Figure 5:
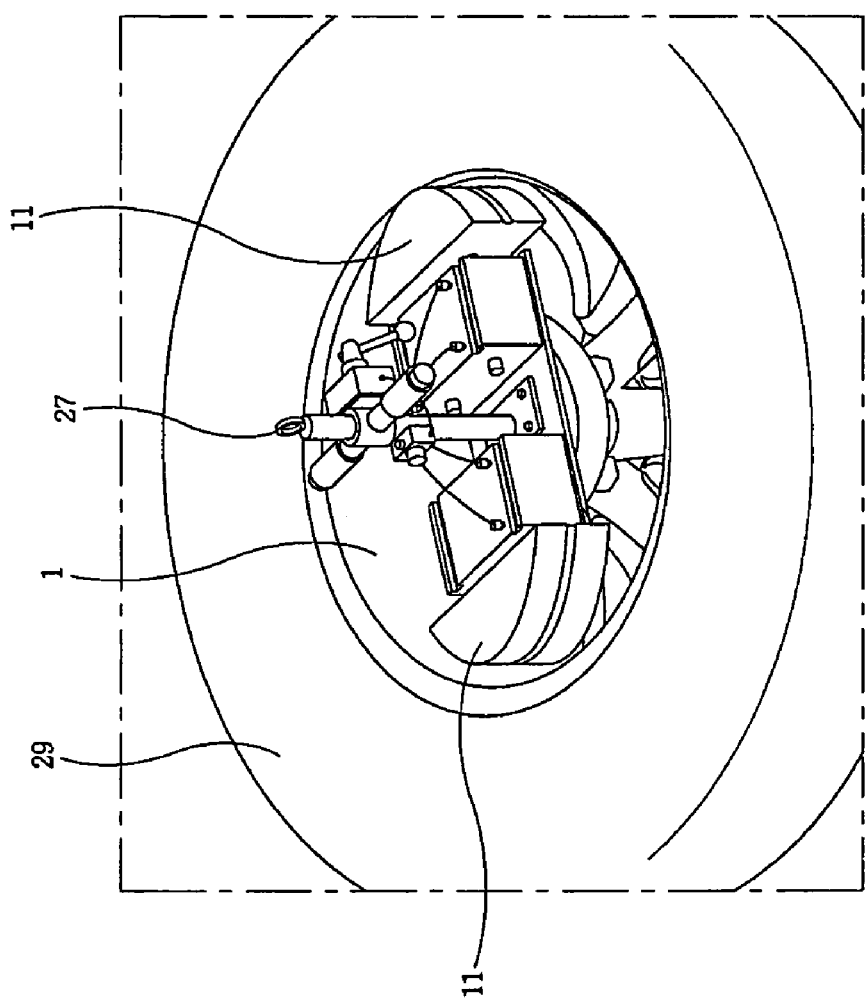
Figure 6:
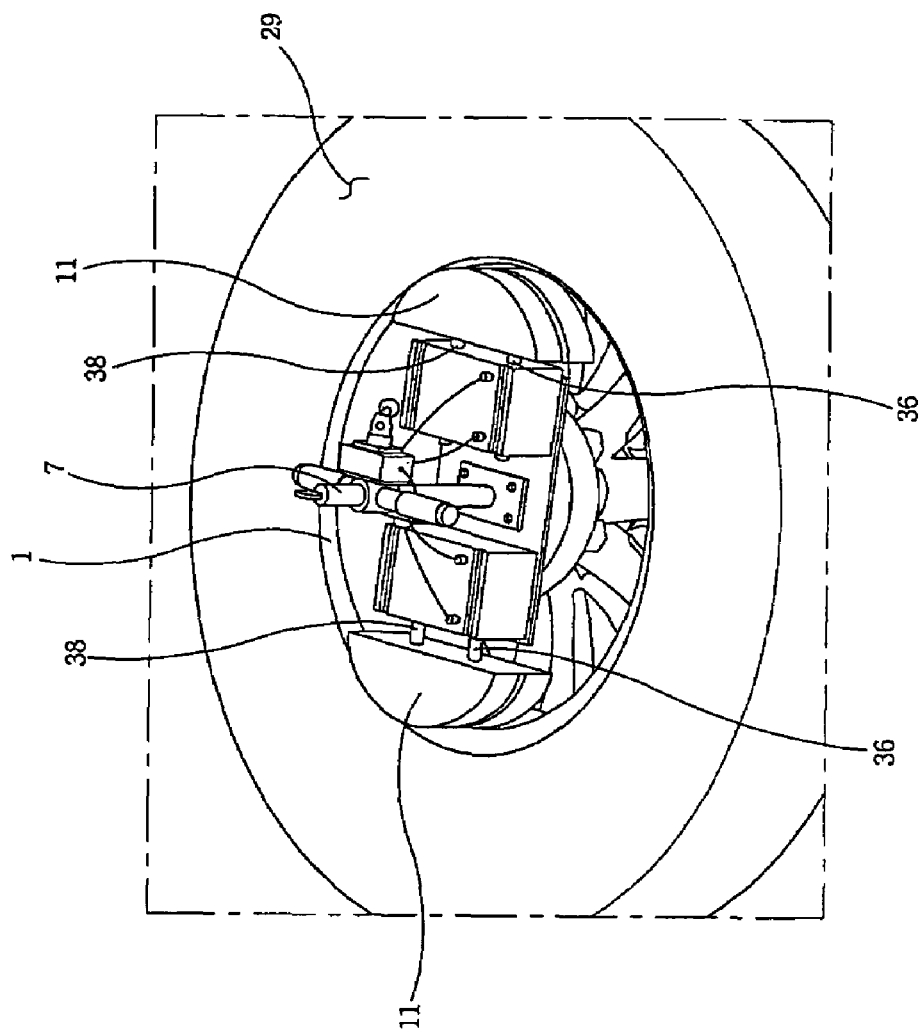

Subsequently, as shown in FIG. 5, the user inserts the sticker weight pressurizer 25 into the wheel 1 and then adjusts the direction thereof such that one of the pressure blocks 11 faces the sticker weight 3, which has been preliminarily adhered.

The user thereafter manipulates the lever 21 of the direction control valve 15 such that the direction control valve 15 supplies pneumatic pressure, transferred from the regulator valve 13, into the double-acting cylinders 9.

Then, the double-acting cylinders 9 operate the pressure blocks 11 in directions moving away from each other, so that one pressure block 11 pressurizes the sticker weight 3, which has been preliminarily adhered to the circumferential inner surface of the wheel 1, onto the circumferential inner surface of the wheel 1.

As a result, the sticker weight 3 is securely adhered to the circumferential inner surface of the wheel 1 under high pressure by the double-acting cylinder 9, thus being prevented from being removed when a vehicle travels.

As such, after sufficient pressure is applied to the sticker weight 3, the user manipulates the lever 21 in the opposite direction to the above case in order to operate the double-acting cylinders in reverse directions. Then, the pressure blocks 11 are moved in directions approaching each other.

Thereafter, the sticker weight pressurizer 25 is removed from the wheel 1, thus completing the installation of the sticker weight 3 on the wheel 1.

As is apparent from the foregoing, the present invention presses a sticker weight onto a circumferential inner surface of a wheel under sufficient pressure, such that the sticker weight is securely adhered to the circumferential inner surface of the wheel, thus ensuring reliable adhesion of the sticker weight.

What is claimed is:

1. A sticker weight pressurizer for wheels, comprising:
a base plate;
a hanger protruding upwards from a center portion of the base plate;
a pair of double-acting cylinders disposed on the base plate on opposite sides of the hanger;
a pressure block provided on an end of a piston rod of each of the double-acting cylinders;
a regulator valve that adjusts pressure of compressed air; and
a direction control valve that transfers pressure, supplied from the regulator valve, to the double-acting cylinders.

2. The sticker weight pressurizer as defined in claim 1, wherein each of the pressure blocks has an outside surface that describes an arc having a curvature radius that is smaller than a radius of an inner surface of a wheel.

3. The sticker weight pressurizer as defined in claim 1, wherein both the regulator valve and the direction control valve are mounted to the hanger, and the sticker weight pressurizer further comprises:
a grip protruding from the hanger in a lateral direction.

* * * * *